(12) United States Patent
Korte

(10) Patent No.: US 6,450,010 B1
(45) Date of Patent: Sep. 17, 2002

(54) APPARATUS AND METHOD FOR TESTING PERVIOUSNESS

(75) Inventor: Joern Korte, Huelben (DE)

(73) Assignee: bielomatik Leuze GmbH & Co. (DE)

( * ) Notice: Subject to any disclaimer, the term of this patent is extended or adjusted under 35 U.S.C. 154(b) by 0 days.

(21) Appl. No.: 09/513,002

(22) Filed: Feb. 25, 2000

(30) Foreign Application Priority Data

Mar. 10, 1999 (DE) .......................................... 199 10 486

(51) Int. Cl.$^7$ .......................... G01M 3/04; G01M 3/34; G01M 3/00
(52) U.S. Cl. ................. 73/49.2; 73/49.3; 73/52
(58) Field of Search .................. 73/49.2, 49.3, 73/49.8, 46, 52

(56) References Cited

U.S. PATENT DOCUMENTS

| | | | |
|---|---|---|---|
| 4,118,972 A | * 10/1978 | Goeppner et al. ............. | 73/40 |
| 5,201,213 A | * 4/1993 | Henning .................... | 73/49.2 |
| 5,277,468 A | * 1/1994 | Blatt et al. ................. | 294/64.2 |
| 5,372,031 A | * 12/1994 | Harmand ...................... | 73/40 |
| 5,476,083 A | 12/1995 | Blumenstock | |
| 5,735,252 A | 4/1998 | Blumenstock | |
| 5,756,882 A | * 5/1998 | Cranfill et al. ................. | 73/46 |
| 5,996,401 A | * 12/1999 | Lewis ........................ | 73/49.2 |

FOREIGN PATENT DOCUMENTS

| | | |
|---|---|---|
| DE | 42 32 148 A1 | 3/1994 |
| DE | 43 42 431 A1 | 6/1995 |

* cited by examiner

Primary Examiner—Hezron Williams
Assistant Examiner—Jay L. Politzer
(74) Attorney, Agent, or Firm—Akerman Senterfitt

(57) ABSTRACT

For determining the adequate perviousness of venting tube nipples (4) on fuel tanks (3) made of plastics material a test duct (12) is connected to the nipple (4) and air drawn into the test duct (12) from the tank (3). From measuring, the partial vacuum of e.g. approx. 5 mbar or the volume flow rate in the test duct (12) it can be determined whether the nipple (4) and its joint (9) to the tank (3) are sufficiently permeable. This test is very precise and silent and needs only little consumption of compressed air. Thereby the load on the sealing seat (14) between test duct (12) and nipple (4) is only slight.

22 Claims, 1 Drawing Sheet

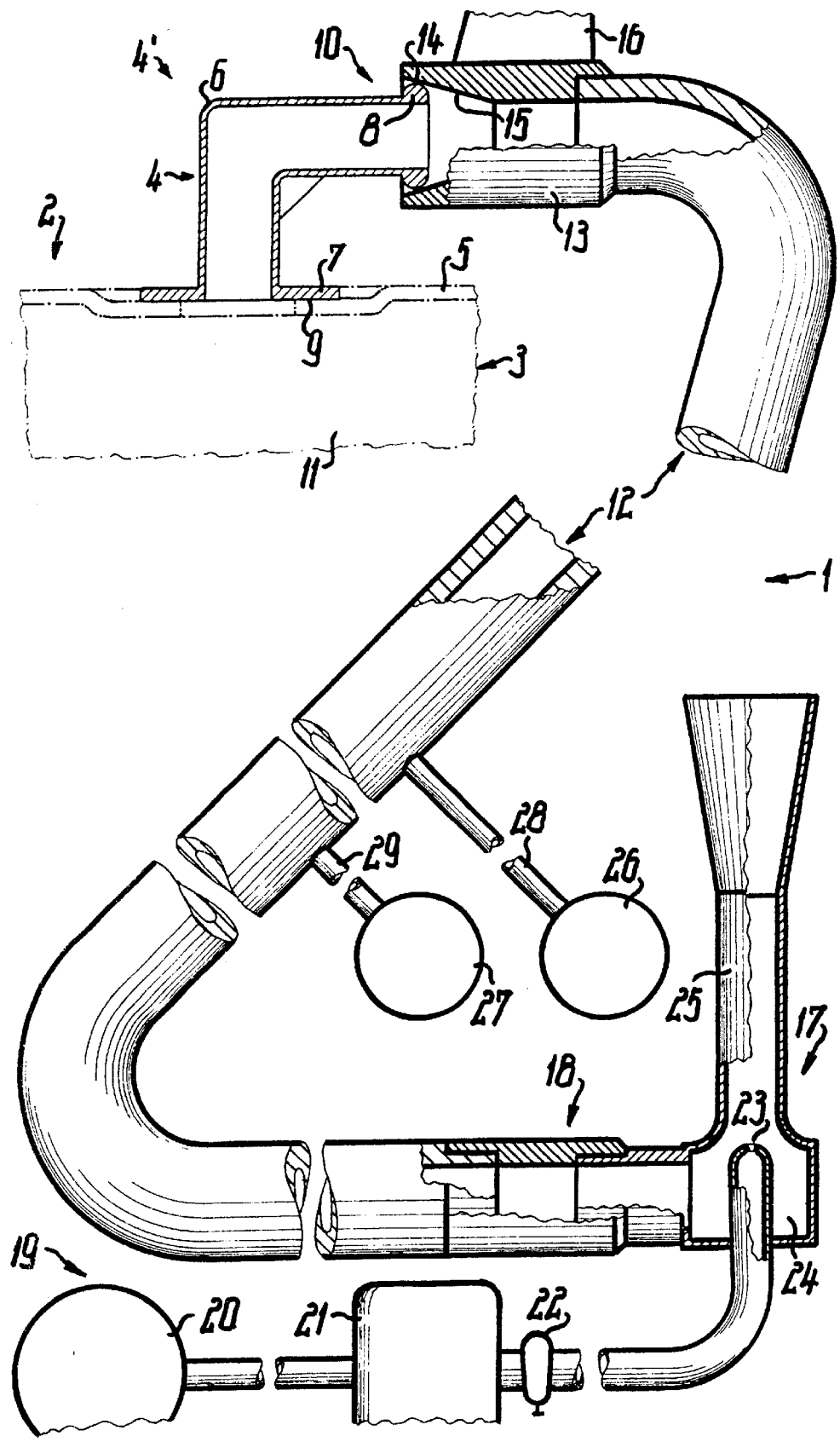

APPARATUS AND METHOD FOR TESTING PERVIOUSNESS

TECHNICAL FIELD AND BACKGROUND OF THE INVENTION

The invention is related to means and a method for registering permeability of ducts or seam structures.

In operation tanks and other hollow structures need to be free of by-pass leakage. Often sufficient tank venting is needed, e.g. during or after being filled with a fluid which is highly volatile and thus gases out. For venting a connector or connector assembly consists of a single or several individual connectors, such as hose nipples to which separate flexible venting tubes are to be connected to collect the venting flow at a suitable location. Where plastics fuel tanks or the like are concerned each nipple is secured separate to the tanks wall outside by a joint such as a weld. The nipple passage is then connected to the tanks interior via an opening in the tank wall.

In producing the nipple or joint the flow cross-sections may be constricted or closed. Then no longer a sufficient volume flow rate of e.g. min. 40 or 50 l/min. for a given pressure gradient of max. 7 or 6 mbar can pass. For engine fuel tanks of internal combustion engines, especially on motor vehicles, a common flow capacity of all venting nozzles of e.g. approx. 60 l/min. at an overpressure of approx. 5 mbar in the fuel tank is specified. This capacity is thus to be tested before the tank is installed in the vehicle or before it is sealed tight. Instead of thus testing the tank when still dry, it may be tested after installation. Thus proper function or flow capacity of a tank venting system is tested during intentional operation of the filled tank. Soilage may constrict the flow cross-sections.

This test may be done by dynamic or dammed pressure testing. Thereby a gaseous test flow, such as air, is fed into the tank via the connector and any restriction in the connectors flow capacity is detected by way of an overpressure materializing in the test duct. Thereby a high pressure gradient needs to be generated. Thus, e.g., the overpressure in the test duct amounts to approx. 1 bar with the flow cross-section closed. Accordingly the flow capacity of perviousness can not be measured at a substantially lower pressure gradient of e.g. less than 200 or 50 mbar. Apart from this, generating the cited overpressure is technically expensive. The pressure flow results in very high volume flow rates and thus in very noisy test operation. Also sealing between the test duct and the tank connector is difficult under the high test pressure. With increasing flow cross-section of the tank connector the tests accuracy is diminished. This inaccuracy is already excessive at a flow cross-section of 30 mm$^2$ corresponding to a passage diameter of 6 mm. However, the tank connectors to be tested may have significantly larger flow cross-sections of e.g. 80 mm$^2$ corresponding to a passage diameter of 10 mm, of 115 mm$^2$ corresponding to a diameter of 12 mm or of 155 mm$^2$ corresponding to a diameter of 14 mm.

OBJECTS OF TEE INVENTION

An object is to provide an apparatus and a method which obviate the disadvantages of known configurations. Another object is to enable precise testing even for large flow cross-sections. A further object is to permit testing of flow capacity under actual test conditions. Still another object is to keep consumption of the test medium low. A still further object is to carry out testing with little noise. An object is also to permit each individual connector to be sealingly connected to the test duct by simple means.

SUMMARY OF THE INVENTION

According to the invention a partial vacuum is applied for testing. In case of fully automated testing on a production line the tank is, in sequence, embedded in a holder positionally secured by tension, cut out to have openings in its wall, fitted with a connector body in the vicinity of each opening by welding or the like, before the flow capacity of this connection is then tested. The tank or connector may have more than 10, 20 or 30 such individual connectors. All of them are tested simultaneously and/or in sequence. For example, the tank may be equipped with several connectors in a welding station and then transported on the conveyor to the next welding station where further connectors are fitted. Testing the perviousness of the fitted connectors may already be done in the first or subsequent station whilst at the same time further connectors are fitted.

For reliable testing with partial vacuum or suction flow a very slight pressure gradient between the test duct and the tank chamber is sufficient. Thus deformation of the tank due to pressure gradient is avoided even when the dimensionally rigid tank has very thin walls. To further advantage compressed air consumption and noisiness are low. Producing a seal at the transition between the test duct and the tank connector is also reliable when the test duct during testing connects to the tank connector only by axial or radial pressure contact while being linearly removable. The perviousness can be directly measured as volume flow rate for a constant pressure gradient. In all of the flow cross-sections cited the measuring accuracy is very high.

A rated flow capacity, i.e. a minimum perviousness for intentional operation is set for each or all individual connectors of the tank. The low pressure of e.g. 5 mbar is selected so that it exists in the test duct when this rated flow capacity is given. Then a function or calibration curve is plotted which reproduces the relation between the low pressure and the volume flow rate. Changes in the low pressure are measured for a constant suction capacity and for variations in the effective flow cross-sections. Changes in the volume flow rate are measured at a constant low pressure while also varying the effective flow cross-sections. From the resulting calibration curve a measurement of the low pressure at constant suction capacity permits detecting whether the rated or minimum perviousness is given.

However, the test may also happen by directly measuring the volume flow rate in the test duct, if hereby the low pressure as put on is maintained constant.

BRIEF DESCRIPTION OF THE DRAWINGS

Example embodiments of the invention are explained in more detail in the following. Illustrated in the sole drawing is a simplified representation of the apparatus according to the invention.

DETAILED DESCRIPTION

The illustrated means 1 determine the flow passage of a test object 2 comprising a tank 3 and a tank connector 4', namely a plurality of individual connectors 4, of which only one is shown. One-part tank 3 has walls 5 of thermoplastic material, to the outsides of which the connectors 4 are fixed. Each one-part connector 4 is made of thermoplastic material, has an elbow or straight tube and a flange 7, 8 at each tube end. The Annular or disk-shaped flange 7 is fixed by a weld 9 annularly and sealingly joining the outer end face of flange 7 to the outside of wall 5 about an opening which traverses wall 5 and which is larger than the smallest or full-length constant flow cross-section of connector 4.

For testing, the free flange 8 is connected to apparatus 1 via a quick-release test connection 10 made only during testing. Thereafter connection 10 is untied before test object 2 is conveyed on. Means 1 include test duct 12 and, at the free end thereof, a union or clutch collar 13 of connection 10, the other union of which is flange 8. Thus the constant flow cross-section of duct 12 and of collar 13 are sealingly connected to the same size flow cross-section of connector 4 in an axial linear motion while being removable in the counter direction. Sealing seat 14 between connector 4 and duct 12 is formed by the outer cirumference of flange 8 and an acutely angled inner cone 15 of collar 13. Instead, or in addition, an elastomer seal or ring provides for seat 14 at the inner circumference of collar 13.

Collar 13 or the inner circumference 15 at seat 14 is made of a material which is more rigid or less resilient than the material of connector 4. This material can be a metal, whilst duct 12 is flexible, e.g. a tube. However, the flow cross-section of duct 12 is not altered by changes of the pressure gradient as operationally occuring. Duct 12 may be provided at collar 13 with a holder 16 which aligns collar 13 and is connected to a movably powered or motor-driven arm that brings collar 13 up on connector 4, with the test object stationary, to produce connection 10.

Via a quick-release connection 18 the other end of tube 12 is connected to a low pressure or vacuum source 17 such as a venturi nozzle. Source 17 is in turn connected to a source 19 for compressed gas or air. Source 19 has pump 20 and accumulator 21 for compressed air connected to the air output of pump 20. The output of reservoir 21 or of source 19 is connected via valve 22 to nozzle 23 of source 17. On exit of compressed air from nozzle 23 into a canal or funnel 25 a partial vacuum is created upstream of nozzle 23 in chamber 24. Thus a suction flow is orginated in duct 12 and flows through chamber 24, and therefrom through suction canal 25 into the open. With connection 10 made the suction flow additionally flows through free orifices into chamber 11 of tank 3, from chamber 11 through the opening in wall 5 into connector 4 and therefrom into duct 12.

Within the flow cross-section of duct 12 or indirectly connected thereto sensors 26, 27 are provided. They are connected via separate branch ducts 28, 29 to the flow cross-section of duct 12. Sensor 26 located nearer to collar 13 belongs to a flow detector which continously measures the volume flow rate or variations thereof in duct 12. The other sensor 27 belongs to a meter which continously measures the vacuum or variations thereof in the flow duct. The spacing of the associated measuring point at duct 12 from collar 13 is selected smallest possible but may be along duct 12 at most 1.5 to 1 m or 2 to 3 m.

For measuring flow through rate of nipple 4 and joint 9 the test object 2 is motor-conveyed into the working zone of apparatus 1, upon which a collar 13 of duct 12 or of separate ducts 12 is sealingly connected to each nipple 4 to be tested. Therefor collar 13 moves by motor power against nipple 4 to make seat 14. Before, during or directly thereafter a suction flow is conveyed through duct 12 by opening valve 22 which as a pressure regulating valve also maintains the partial vacuum in duct 12 permanently constant. Then, the volume flow rate traversing suction duct 12 is measured by the equipment 26. If the result is high enough, it positive. Should it be below a limit value, however, in equipment 26 a corresponding alert signal is generated which is passed on via a signal lead to a display (not shown). Thus the particular object 2 is identified as a reject and excluded from further use. After testing, connection 10 is untied and object 2 is transported to the next station with the conveyor. Before, during or thereafter the suction flow in duct 12 can also be shut off.

Instead it is also possible to maintain the pressure capacity of source 19 or the suction capacity of source 17 and thus the suction capacity in duct 12 constant irrespective of the flow cross-sections of object 2. In this case the low pressure in duct 12 is measured by equipment 27. If this pressure is sufficiently low the test result is positive. Should the pressure be too high, however, the particular object 2 is identified as a reject and the further actions are the same as described above in view of testing with equipment 26.

What is claimed is:

1. An apparatus for testing perviousness of a tank connector of a tank including at least one individual connector which has a connector flow cross-section, said apparatus comprising:

a test duct connectable to the individual connector for receiving a test fluid from the tank;

a test vacuum source connectable to said test duct for producing a pressure gradient in the test duct; and at least one flow rate sensor for sensing a volume flow rate of the test fluid drawn through said test duct from the tank due to suction created by said test vacuum source, whereby the perviousness of the tank connector is determined.

2. The apparatus according to claim 1, wherein a clutch collar is included for quickly and releaseably connecting said test duct to the at least one individual connector.

3. The apparatus according to claim 2, wherein said clutch collar is a plug sleeve sealable to the at least one individual connector.

4. The apparatus according to claim 2, wherein said clutch collar includes a sealing cone for contacting the at least one individual connector.

5. The apparatus according to claim 1, wherein said vacuum source includes a venturi nozzle.

6. The apparatus according to claim 5, wherein said venturi nozzle is connected to a positive pressure source to thereby generate a partial suction in said test duct.

7. The apparatus according to claim 1, further including control means, wherein said control means maintain a partial suction in said test duct of at most at least one of 100 mbar, 20 mbar, and 10 mbar, when said test duct is closed at a location upstream of said vacuum source.

8. The apparatus according to claim 1, further comprising a pressure sensor.

9. The apparatus according to claim 1, further including a signal transmitter, wherein said at least one sensor controls said signal transmitter.

10. The apparatus according to claim 1, further including at least one branch duct, wherein said at least one branch duct interconnects said at least one sensor and said test duct.

11. The apparatus according to claim 1, wherein the individual connector is a bonded plastic nipple.

12. A method for testing perviousness of a tank connector of a tank including at least one individual connector which defines a connector flow cross-section, said method comprising:

exposing the tank via the tank connector to a fluid flow of a test fluid;

sensing at least one test value during fluid flow, the test value being a volume flow rate of the fluid flow through the connector; and evaluating said at least one test value and correlating the test value to the flow cross-section of the at least one individual connector, wherein the fluid flow through the at least one individual connector is directed out of the tank by suction.

13. The method according to claim 12, wherein a pressure inside the tank is maintained substantially constant while the fluid flow is sucked through the at least one individual connector.

14. The method according to claim 12, wherein during testing of the perviousness of the tank, the tank is directly open to environmental atmosphere except for at the tank connector so that the test fluid is sucked in from the environmental atmosphere.

15. The method according to claim 12, wherein the tank connector includes a plurality of the individual connectors, each individual connector being simultaneously tested by separately measuring the fluid flows through the individual connectors.

16. The method according to claim 12, wherein the tank connector includes a plurality of the individual connectors, each of the individual connectors defining a connector flow cross-section which is exposed to a suction power proportional to the flow cross section of each of the individual connectors.

17. The method according to claim 12, wherein the tank connector includes a plurality of the individual connectors, and during the measurement of the volume flow rate, each of the individual -connectors are exposed to a negative pressure which is substantially equal at each of the individual connectors.

18. The method according to claim 12, wherein the tank connector includes a plurality of the individual connectors, the test values of substantially all of the individual connectors being monitored together.

19. The method according to claim 12, wherein the perviousness of the tank connector is tested with a fluid flow of at least 40 to 50 liters per minute at a pressure gradient of at least 3 to 5 mbar.

20. The method according to claim 12, wherein the tank connector defines at least one connector flow cross-section to be tested, the connector flow cross-section being above 30 to 150 mm$^2$.

21. The method according to claim 12, wherein the volume flow rate is measured by connecting a test duct to the tank connector, generating a test fluid flow through the test duct and the tank connector and determining the volume flow rate by measuring the pressure drop in the test duct.

22. An apparatus for testing perviousness of a tank connector for a tank including at least one individual connector, said apparatus comprising:

a test duct connectable to the individual connector for receiving a test fluid from the tank;

a test vacuum source connectable to said test duct;

at least one flow rate sensor for sensing a volume flow rate of the test fluid drawn through said test duct from the tank due to suction created by said test vacuum source; and means for comparing the volume flow rats to a predetermined amount, whereby the perviousness of the tank connector is determined.

* * * * *